United States Patent
Arumugam et al.

(10) Patent No.: US 12,010,990 B2
(45) Date of Patent: Jun. 18, 2024

(54) HYDROPHOBIC POLYMERS AS OIL RHEOLOGY MODIFIERS FOR AGROCHEMICAL FORMULATIONS

(71) Applicants: Dow Global Technologies LLC, Midland, MI (US); Rohm and Haas Company, Philadelphia, PA (US)

(72) Inventors: Selvanathan Arumugam, Collegeville, PA (US); Suraj S. Deshmukh, Lake Jackson, TX (US); Hui Shao, Indianapolis, IN (US); Dan Wu, Collegeville, PA (US); Ralph C. Even, Collegeville, PA (US); Christopher J. Tucker, Midland, MI (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 804 days.

(21) Appl. No.: 16/767,703

(22) PCT Filed: Nov. 27, 2018

(86) PCT No.: PCT/US2018/062519
§ 371 (c)(1),
(2) Date: May 28, 2020

(87) PCT Pub. No.: WO2019/108500
PCT Pub. Date: Jun. 6, 2019

(65) Prior Publication Data
US 2020/0288704 A1    Sep. 17, 2020

Related U.S. Application Data

(60) Provisional application No. 62/592,704, filed on Nov. 30, 2017.

(51) Int. Cl.
| | |
|---|---|
| *A01N 25/04* | (2006.01) |
| *A01N 35/10* | (2006.01) |
| *A01N 37/44* | (2006.01) |
| *A01N 41/04* | (2006.01) |
| *A01N 43/08* | (2006.01) |

(52) U.S. Cl.
CPC ............ *A01N 25/04* (2013.01); *A01N 35/10* (2013.01); *A01N 37/44* (2013.01); *A01N 41/04* (2013.01); *A01N 43/08* (2013.01)

(58) Field of Classification Search
CPC ........ A01N 25/04; A01N 25/10; A01N 35/10; A01N 37/44; A01N 41/04; A01N 43/08; C08G 18/10; C08G 18/246; C08G 18/3228; C08G 18/4854; C08G 18/722; C08G 18/73; C08G 18/75; C08G 2310/00; C08G 18/755; C08G 18/2865; C11D 1/00
USPC ....................................... 514/772.7
See application file for complete search history.

(56) References Cited

U.S. PATENT DOCUMENTS

| | | |
|---|---|---|
| 3,131,119 A | 4/1964 | Fordyce et al. |
| 3,773,926 A | 11/1973 | Knowles et al. |
| 4,429,097 A | 1/1984 | Chang et al. |
| 6,210,696 B1 | 4/2001 | Gore et al. |
| 6,420,466 B1 | 7/2002 | Haubennestel et al. |
| 6,479,432 B1 | 11/2002 | Sixl |
| 6,673,747 B2 | 1/2004 | Kruger et al. |
| 2004/0127674 A1* | 7/2004 | Haubennestel .......... C09D 5/04 528/65 |
| 2010/0190648 A1* | 7/2010 | Tollington ............. A01N 25/04 514/525 |
| 2011/0275516 A1 | 11/2011 | Wu et al. |
| 2017/0105411 A1 | 4/2017 | Knight et al. |
| 2019/0357528 A1 | 11/2019 | Holliday et al. |

FOREIGN PATENT DOCUMENTS

| | | |
|---|---|---|
| EP | 0875142 | 11/1998 |
| JP | 2017506690 A | 3/2017 |

OTHER PUBLICATIONS

International Search Report & Written Opinion for related PCT Application PCT/US2018/062519, dated Feb. 12, 2019 (13 pgs).
International Preliminary Report on Patentability for related PCT Application PCT/US2018/062519, dated Jun. 11, 2020 (7pgs).

* cited by examiner

*Primary Examiner* — Anna R Falkowitz

(74) *Attorney, Agent, or Firm* — Brooks, Cameron & Huebsch, PLLC

(57) ABSTRACT

Stable dispersions of pesticides in agricultural oil are provided. In particular, the dispersions include a particulate pesticide, agricultural oil, and an agricultural oil-soluble polymer.

2 Claims, 2 Drawing Sheets

HYDROPHOBIC POLYMERS AS OIL RHEOLOGY MODIFIERS FOR AGROCHEMICAL FORMULATIONS

This application is a National Stage Application under 35 U.S.C. § 371 of International Application Number PCT/US2018/062519, filed Nov. 27, 2018 and published as WO 2019/108500 on Jun. 6, 2019, which claims the benefit to U.S. Provisional Application 62/592,704, filed Nov. 30, 2017, the entire contents of which are incorporated herein by reference in its entirety

FIELD OF DISCLOSURE

The present disclosure relates generally to dispersions of pesticides in agricultural oil. More specifically, but without limitation, the disclosure relates to such dispersions comprising a polymeric rheology modifier.

BACKGROUND

Many pesticides exhibit poor solubility and/or dispersibility in water. As a result, pesticides, or actives, are commonly supplied as a formulation comprising a dispersion of solid particles in a hydrocarbon liquid. Active solids are typically from 0.5 to 10 microns in size, and these liquid formulations are referred to as either oil dispersions (OD) or suspension concentrates (SC) depending on the formulation composition. Oil dispersions offer several potential advantages to agrochemical formulators, such as incorporation of multiple and/or water sensitive active ingredients, better penetration, spread, rainfastness and persistency, and built-in adjuvant capability.

The basic components of an agricultural oil dispersion formulation are the solvent or oil phase and the dispersed solid phase. These basic components may include active ingredients, petroleum or naturally derived solvents, safeners, rheology modifiers, emulsifiers, dispersants and other components that help deliver the desired attributes of the product. Rheology modifiers provide physical stability to the formulation by increasing the viscosity of the liquid phase in order to prevent insoluble active ingredient particles from falling out of suspension and forming a layer at the bottom of the storage container. This phenomenon, known as sedimentation, can result in difficulties in the delivery and use of the product if the sediment layer of particles forms a hard pack that is difficult to disperse and re-suspend. A related physical instability of liquid formulations is syneresis. Syneresis in an oil dispersion formulation is generally measured as the amount of top-clearing due to phase separation.

The major challenge for the adaption of oil dispersions for agrochemical formulations has been the lack of a suitable anti-settling agent to prevent agglomeration and settling of actives. Rheology modifiers used in current products, which are mostly based on hydrophobically modified clays or silica particles, are often beset with issues related to dispersion stability and cleanout procedures.

The clay or the silica gel network in oil dispersions can be visualized as a "house of cards" structure. The network provides sufficient zero shear viscosity to keep the active particles suspended. The structure collapses upon dilution with water and, in the presence of suitable emulsifiers and dispersants, a dispersion forms. However the "house of cards" structure resulting from clay or silica based rheology modifiers is very sensitive to any shear/stress applied to the system during storage or shipping, and tends to collapse over long time periods, thereby leading to syneresis in the oil dispersions. Another issue is that additives, such as emulsifiers and dispersants, are known to react with the surface of inorganic particle-based rheology modifiers, thereby further contributing to the collapse of the gel structure. The failure of the clay/silica gel structure is mostly irreversible and thus results in gelation in the water tank during the dilution process. This further burdens the mixing tank clean out procedures for users.

In addition to clay or silica, polymeric dispersing agents have been employed. For example, U.S. Pat. No. 6,210,696 discloses a stable dispersion of a pesticide in an agricultural oil including: a pesticide having a particle size from 0.5-10 microns and selected from the group consisting of chlorinated nitrile, triazole, aralkyl triazole, triazole anilide, benzamide, alkyl benzamide, diphenyl ether, pyridine carboxylic acid, chloroaniline, organophosphate, phosphonic glycine salt, and mixtures thereof; an agricultural oil; and an agricultural oil-soluble polymer, the polymer having a weight average molecular weight from 3,000 to 120,000 and including 2.5 to 35% by weight of a copolymerized polar monomer.

US 2011/0275516 teaches that when certain polymers or oligomers capable of hydrogen bonding are used in combination with clay or silica type rheology modifiers, in the absence of protic solvents, they provide physical stability to oil dispersion formulations of agrochemical products.

Hydrophobic polyamides are one of the most common commercially available polymer based rheology modifiers for thickening of oils. They thicken oils via a gel structure constructed by H-bonding between the amide groups. While they work well to some extent, they suffer from compatibility issues with non-polar hydrophobic oils, such as ARO-MATIC 200, particularly at elevated temperatures.

Due to the complex nature of agrochemical oil dispersions, formulation flow behavior and dispersion stability are difficult to predict over the wide range of use conditions encountered. There is a clear market need for better-performing and/or alternative rheology modifiers that facilitate long-term agriculture pesticide formulation stability.

SUMMARY

The present disclosure includes a dispersion of a pesticide in an agricultural oil comprising: (a) an oil-compatible, polyurea-based polymeric rheology modifier, (b) an agricultural oil, and (c) a dispersed particulate pesticide.

Surprisingly, the polymeric rheology modifier of this disclosure provides improved performance in dispersing particulate pesticides in agricultural oil.

The advantages of the polymeric rheology modifier of this disclosure over other rheology modifiers, such as clay, silica, and amide based rheology modifiers, may include: (1) better oil thickening; (2) excellent phase stability during storage and shipping; (3) stronger polar interactions, such as H-bonding, leading to association at relatively lower concentrations, while not sacrificing compatibility, thus allowing thickening at relatively lower polymer concentration, offering cost and compatibility advantages; (4) better oil compatibility and oil thickening via the incorporation of a hydrophobic polyether into a polyurea, and (5) urea functionality is readily and economically introduced as a bridge in a linear hydrophobic polymer chain without the requirement of a coupling reagent whereas polyamide synthesis usually requires a coupling reagent or special derivatization (e.g. acid chloride from acid).

DETAILED DESCRIPTION

Figure 1:
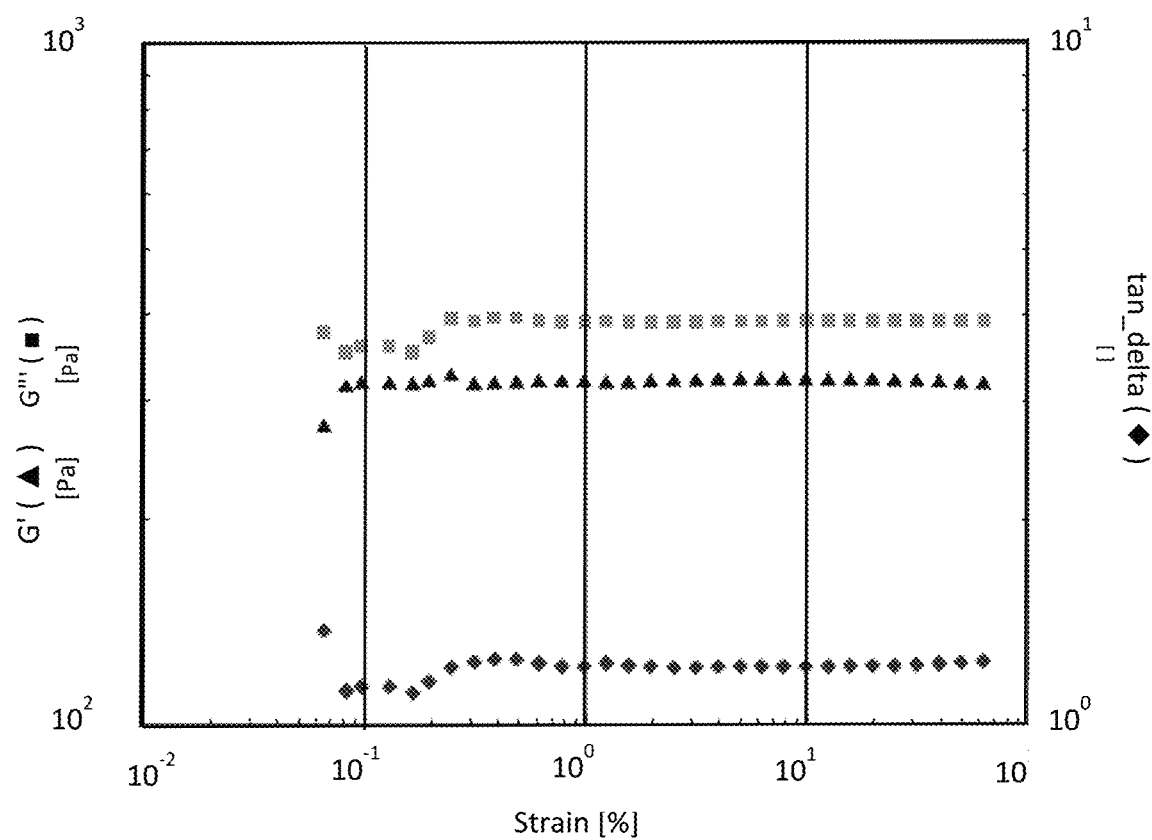
FIG. 1 is plot of an oscillatory strain amplitude sweep test for the polymeric rheology modifier of Example 1A having 6 wt. % polymer in Aromatic 200.

This disclosure includes a dispersion of a pesticide in an agricultural oil, the dispersion comprising: (a) an oil-soluble, urea-based polymeric rheology modifier, (b) an agricultural oil, and (c) a dispersed particulate pesticide. In one embodiment, this disclosure comprises a synergic combination of a rheology modifier that is based on a polyurea-containing hydrophobic polymer, and an emulsifier based on a calcium salt of an alkylbenzene sulfonate.

As used herein, the terms "a," "an," "the," "at least one," and "one or more" are used interchangeably. The terms "comprises" and "includes" and variations thereof do not have a limiting meaning where these terms appear in the description and claims. Thus, for example, "a" material can be interpreted to mean "one or more" materials, and a composition that "includes" or "comprises" a material can be interpreted to mean that the composition includes things in addition to the material.

By "particle size" herein is meant the number average particle diameter as measured, for example by light scattering techniques.

The term "polymer" as used herein includes oligomers.

"Reaction medium" includes, but is not limited to, a liquid in which at least one reactant is at least partially soluble. Thus, for a given reaction, it is possible that all reactants are solubilized in the reaction medium, but it is also possible that the reactants form a suspension in the reaction medium. Other combinations are also possible.

Unless stated to the contrary, implicit from the context, or customary in the art, all parts and percentages are based on weight.

The polymeric rheology modifier of this disclosure may be employed for efficient thickening of hydrophobic agricultural oils, such as methylated seed oil (MSO) or Aromatic 200, at a concentration as low as 1 wt. %. We have discovered that a H-bonding polymer comprising urea functionality prepared using a diisocyanate and a diamine can thicken and/or gel agricultural oils. When these polymeric rheology modifiers are formulated in an oil dispersion (OD), they form a gel structure or network enabled by polar interaction between, e.g., urea functionalities. The gel strength of the OD depends on the molecular weight, composition of the polymer, and the polymer concentration. An increase in the molecular weight of the rheology modifier increases its thickening efficacy. It is believed, without wishing to be bound by any theory, that a longer polymer chain strengthens the polar interaction between urea functional groups due to increased chain entanglement. The composition of the rheology modifier polymer also has an impact on gel strength, as it can increase or decrease the polar interaction between urea moieties. Generally speaking, linear isocyanates and polyethers increase gel strength, while branched analogs decrease gel strength. Increases in the hydrophobicity of the polyether segment tend to weaken gel strength. Adjusting the rheology modifier in view of these guidelines can improve the balance of compatibility and thickening efficacy. Similar to the impact of molecular weight, an increase in the concentration of the polymeric rheology modifier tends to strengthen the gel as it places the urea groups closer to each other. Advantageously, the rheology modifier of this disclosure may be employed to obtain required rheological properties at relatively low rheology modifier concentration to provide cost and compatibility advantages. Thus, to obtain the desired level of stability in a particular composition it is necessary to choose the rheology modifier, and concentration thereof, that provides the desired thickening effect. This can easily be determined by one of ordinary skill in the art based on the guidance provided herein.

The choice of pesticide is not particularly critical with respect to the quality of the dispersion. Examples of pesticides that may be employed herein include particulate agronomically effective fungicides, herbicides, and insecticides such as, for example, chlorinated nitrile, triazole, aralkyl triazole, triazole anilide, benzamide, alkyl benzamide, diphenyl ether, pyridine carboxylic acid, chloroaniline, organophosphate, phosphonic glycine salt, and mixtures thereof. Also included are mixtures of the pesticides with other organic or inorganic agronomically active ingredients, for example, Dithane+Indar, Dithane+chlorothalonil, Dithane+cymoxanil, and Dithane+copper hydroxide. Additional examples of pesticides can be found in U.S. Pat. No. 6,210,696. Mixtures of pesticides may be employed.

Advantageously, the pesticide used in the stable dispersion of this disclosure is crystalline and has a melting point greater than 50 C, molecular weight greater than 200, low solubility, typically less than 1%, in paraffinic solvents and contains polar functional groups such as, for example, ester, carbonyl, hydroxy, and/or cyano.

The agricultural oils used in the stable dispersions and method for forming a stable dispersion of this invention are water-immiscible compounds suitable for agrochemical application, typically of high purity, and generally composed of a single aliphatic or aromatic chemical structure. They may be branched or linear in nature with typical carbon chain lengths of $C_6$ to $C_{26}$ or $C_{20}$ to $C_{26}$. They are characterized by low odor, low solvency for organic and organometallic compounds, low phytotoxicity to biological species, and low volatility. Commercial examples of agricultural oil include: Aromatic 200, Aromatic 150, methylated seed oil (MSO), Orchex 796, Orchex 692, Sunspray 7N, Sunspray 11N, Oleo Branco, Isopar M, Isopar V, 100 Neutral, and Exxsol D-130. Other oils such as mineral oil; crop oil such as, for example, vegetable oil, peanut oil, canola oil and cottonseed oil; or synthetic oil may be acceptable.

The hydrophobic polyurea polymer of the disclosure forms gel networks through polar interaction and/or immiscibility in the hydrophobic agricultural oil. To address issues associated with prior art polymer-based rheology modifiers for Ag formulations, the relatively low molecular polymers bearing functional groups that associate via non-covalent interactions, such as polar interaction, e.g. H-bonding, of this disclosure are efficient alternatives and spontaneously emulsify when formulated in water for application. While not wishing to be bound by any theory, stronger H-bonding enables well-defined gel structures, and simple shear thinning along with addition to water disrupts the H-bonding, and draws the polymer to the oil/water interface to assist in the emulsification process.

The polymeric rheology modifier of the disclosure may be prepared by reacting a diol with a diisocyanate to form a polyurethane prepolymer, followed by reacting the prepolymer with a diamine and a capping agent to form the final polymer, which is referred to herein as a hydrophobic polyurea, a hydrophobic polyurea polymer, or a polyurea-based polymeric rheology modifier.

In one embodiment, the diol is a hydrophobic polyether having 2 hydroxyl moieties. In one embodiment, the hydroxyl moieties are terminal and at opposite ends of the polyether chain. Examples of the diol are included in the following formulas:

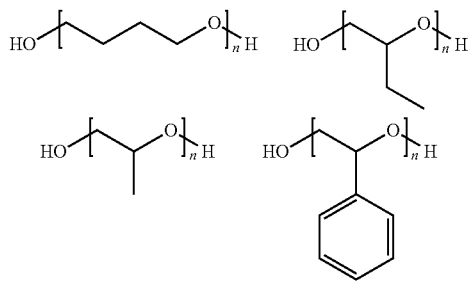

wherein n is from 1 to 200, preferably from 3 to 50, more preferably 20 to 40. The diol may be substituted or unsubstituted. Examples of substituents include aromatic or aliphatic moieties of 1 to 18 carbons, preferably 1 to 6 carbons. In one embodiment, the diol is substituted with an alkyl moiety of 1 to 18 or 1 to 6 carbon atoms. Mixtures of diols may be employed.

Further examples of the diol include poly-n-butylene oxide diol (a.k.a. poly(tetrahydrofuran), poly-iso-butylene oxide diol, poly-propylene oxide diol, dihydroxy terminated polymers and combinations thereof. The diol advantageously is compatible with the hydrophobic agricultural oil in cases where the oil is employed as the reaction medium for the preparation of the polyurethane prepolymer. As used in this context, "compatible" means the diol is miscible with the hydrophobic oil at the reaction conditions of the polyurethane prepolymer formation reaction. The diol may comprise other non-compatible diols in amounts that do not compromise compatibility. More preferably, the diol is p-n-butylene oxide diol, p-iso-butylene oxide diol, p-propylene oxide diol or a combination thereof. The amount of diol employed in the formation of the prepolymer is preferably 0.05 equivalents to 0.95 equivalents to the isocyanate, more preferably from 0.25 to 0.75, and most preferably 0.3 to 0.5.

When a reaction medium, e.g a solvent or the agricultural oil, is employed in the synthesis of the prepolymer, the concentration of the diol in the reaction medium is at least 1 wt. %, more suitably 3 to 75 wt. %, and most suitably is from 10 to 40 wt. %. However, the polyurethane prepolymer may be prepared without using a solvent or oil.

Suitable isocyanates include, e.g., isophorone diisocyanate (IPDI, hexamethylene diisocyanate (HDI), methylene bis(4-cyclohexylisocyanate) (MCI), methylene bis(4-phenylisocyanate) (MDI), polymethylenepolyphenol isocyanate (PAPI), phneylene diisocyanate (PDI) and toluene diisocyanate (TDI). Preferably, the isocyanates of the present invention are IPDI, HDI, PAPI, MDI and combinations thereof. Mixtures of isocyanates may be employed.

The polyurethane prepolymer is made by reacting the diol with the isocyanate, either neat or in a suitable reaction medium, at a temperature of from 20 to 150 C, preferably from 60 to 100 C, preferably in the presence of a catalyst. This reaction and suitable reaction conditions are well-known to those skilled in the art. This reaction advantageously is conducted at ambient pressure. The preferred catalyst can be any metal-based catalyst such as a Sn- and Bi-based or an amine-based catalyst. Many catalysts for this reaction are known to those skilled in the art, and many are commercially available.

The polyurethane prepolymer has two isocyanate moieties for subsequent reaction with the diamine and/or capping agent. The Mn of the prepolymer is preferably from 1,000 to 500,000, more preferably from 1,000 to 80,000 daltons, and most preferably from 1,000 to 20,000 daltons.

In one embodiment, the polyurea-based polymeric rheology modifier is made by reacting the isocyanate moieties of the prepolymer with a diamine in a suitable reaction medium, preferably under ambient conditions, followed by capping with a capping agent. The concentration of prepolymer in a given reaction medium is at least 1 wt. %, more suitably 3 to 75 wt. %, and most suitably from 10 to 40 wt. %. The agricultural oil or a solvent may be employed as the reaction medium.

The diamine is a compound having 2 amino moieties. Advantageously, the diamine moieties are primary or secondary amine moieties. Examples of suitable diamines include diamino alkanes, preferably having from 1 to 18 carbon atoms between the amine moieties, and can be linear or branched. Examples of diamines include ethylenediamine, propanediamine, butanediamine, hexanediamine, dodecanediamine, octanediamine, hexadecanediamine, cyclohexanediamine, cyclooctanediamine, phenylenediamine, toluenediamine, xylenediamine, dianilinemethane, ditoluidinemethane, bisaniline, bistoluidine, etc. Further diamines include polyetherdiamine. The amount of the diamine employed in the preparation of the hydrophobic polyurea is sufficient to provide at least 0.1 equivalent of amine less than the available isocyanate groups in the reaction mixture, and the rest of the unreacted isocyanate is quenched with a capping agent, such as butyl amine. In one embodiment, the amount of the diamine employed in the preparation of the hydrophobic polyurea is sufficient to provide from 0.2 to 0.95 equivalents of amine per equivalent of isocyanate. Mixtures of diamines may be employed.

The capping agent serves to terminate polymer chains. The capping agent advantageously is employed after the diamine is fully or essentially fully reacted. The capping agent has a single moiety that can react with an isocyanate moiety. The capping agent can be linear or branched. Examples of capping agents include monoalcohols, monoamines, and monothiols. Examples of suitable capping agents include amino alkanes and alkanols, preferably having from 1 to 18 carbon atoms. Mixtures of capping agents may be employed.

In the reaction scheme shown below, the diol is polytetrahydrofuran and it is first condensed with excess isophorone diisocyanate to obtain a polyurethane prepolymer having terminal isocyanate moieties as shown in Scheme 1 (Step 1). Isophorone diisocyanate (IPDI) is preferred for its hydrophobicity and the flexibility in its molecular structure, which may enhance the compatibility of the polymeric rheology modifier in oil formulations. The isocyanate terminated polyurethane prepolymer is then coupled with 1, 2-diaminopropane (Step 2 of Scheme 1) to incorporate urea blocks in the linear prepolymer to form the polymeric rheology modifier. Capping is then done to minimize polymer chains with terminal amine groups.

Scheme 1

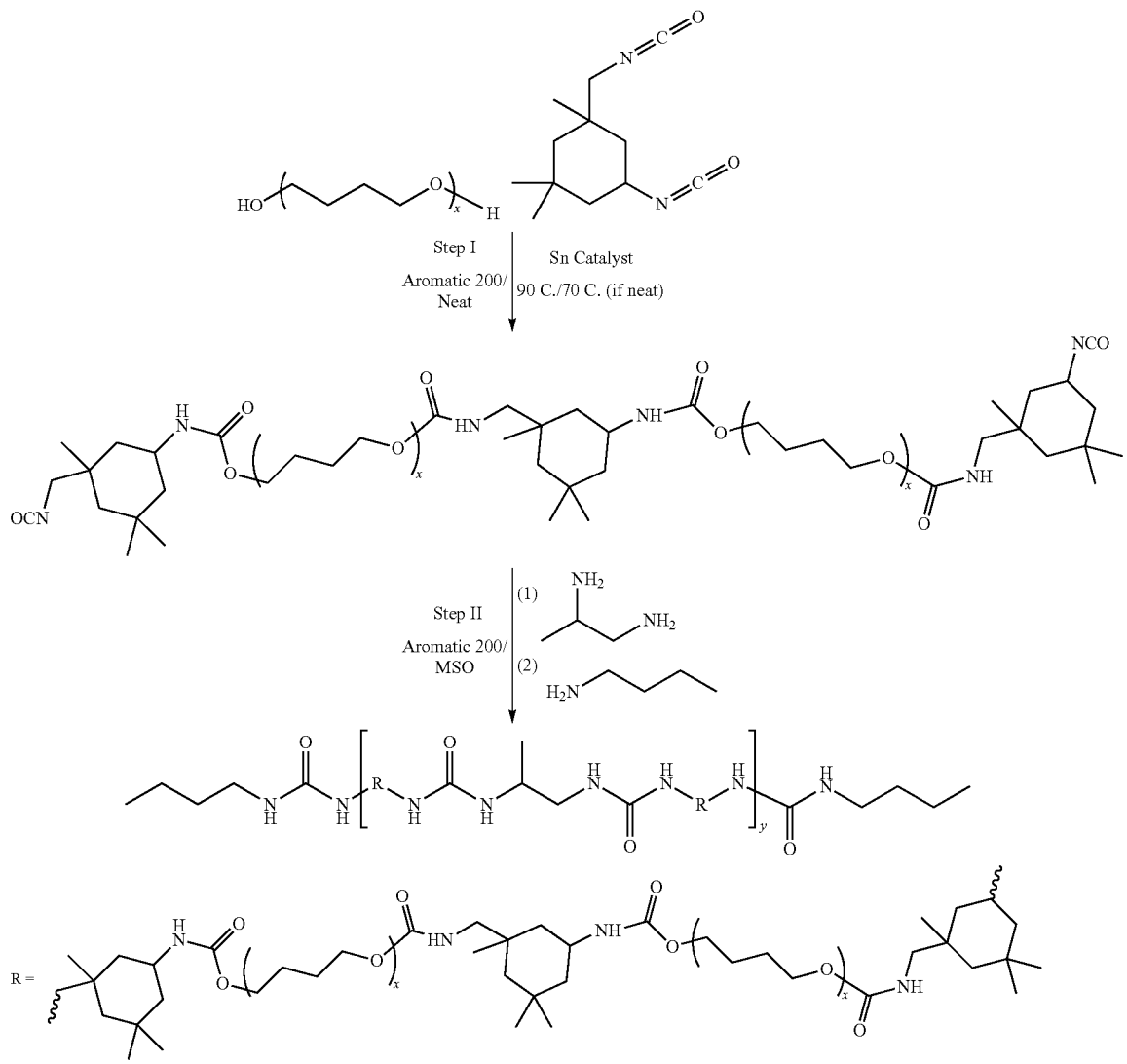

The product rheology modifier advantageously has a number average molecular weight (Mn) of from 1,000 daltons to 100,000 daltons, or from 15,000 to 85,000 daltons. For the product rheology modifier shown in Scheme 1, x is from 1 to 200, preferably from 3 to 50, and more preferably 20 to 40; and y is from 1 to 30, preferably from 1 to 10, more preferably 1 to 5; however, these values for x and y also apply to other product rheology modifiers.

In one embodiment, the hydrophobic polyurea is prepared as described herein and may be represented by the formula CA-PUr-PUP-PUr-CA, where PUP represents a polyurethane prepolymer reaction remnant, each PUr is a polyurea segment or block, and each CA is the reaction remnant of a capping agent. A polyurethane prepolymer reaction remnant is the portion of the prepolymer remaining in the rheology modifier or an uncapped rheology modifier precursor, after the prepolymer is reacted with the diamine. A polyurea segment or block is similarly defined, and the reaction remnant of a capping agent is similarly defined.

In one embodiment, the dispersion optionally includes an alkylbenzene sulfonate as rheology promoter. The alkylbenzene sulfonate serves to improve the storage modulus of the gel structure. When employed, the amount of the alkylbenzene sulfonate is from 0.1 to 10 wt. %, preferably from 1 to 5 wt. % based on the weight of the dispersion. Examples of alkylbenzene sulfonates include calcium alkyl sulfonate, sodium alkyl sulfonate, potassium alky sulfonate, etc. The most preferred alkyl benzene sulfonate is calcium dodecyl benzene sulfonate. Mixtures of alkylbenzene sulfonates may be employed.

Calcium dodecylbenzene sulfonate is commonly used as an emulsifier in OD based agricultural formulations. However, in the dispersion of this disclosure, this emulsifier may serve both as an emulsifier and as a rheology promoter in the presence of the polyurea-based polymeric rheology modifier.

In a general procedure for preparing the oil dispersion composition of the present disclosure, the agricultural oil is charged into a vessel and the rheology modifier is added into the vessel with high shear mixing to allow homogeneous dispersion of the rheology modifier. In one embodiment, after mixing, the oil and rheology modifier appear to be a clear, single phase. The active ingredients and optional components, e.g., safener, dispersant, and emulsifier, may then be added to the vessel under shearing conditions until the formation of a uniform oil dispersion is achieved. The polyurea-based hydrophobic polymer capable of forming a gel network may be introduced into the oil dispersion at a point where the desired thickening effect is achieved.

The dispersion of a pesticide in agricultural oil is typically effected with pesticides that are either technical grade particulate pesticides ("technicals") or formulated particulate pesticide compositions such as, for example, wettable powders and dispersible granules. The technical grade particulate pesticides range in active ingredient content from 80 to 98% by weight and are solid at room temperature. The wettable powders and dispersible granules range in active ingredient content from 45% by weight to 75% by weight and have typical compositions as follows: 45 to 75% by weight pesticide; 20 to 50% by weight carrier; 2 to 10% by weight dispersant; and from 2 to 10% by weight surfactant. The wettable powders and dispersible granules typically have been milled to an average particle size in the range of 2 to 10 microns.

The dispersion of this disclosure is a dispersion of a pesticide in an agricultural oil, the dispersion comprising: (a) an oil-soluble, polyurea-based polymeric rheology modifier, (b) an agricultural oil, and (c) a dispersed particulate pesticide. In one embodiment, the dispersion comprises from 0.1 to 20, or preferably from 1 to 6 wt. %, of the polyurea-based polymeric rheology modifier, from 10 to 99.8 wt. %, or 50 to 80 wt. %, of the agricultural oil, and from 0.1 to 20 wt. %, or preferably from 1 to 15 wt. %, of the dispersed particulate pesticide, wherein the total wt. % is 100 wt. %.

The dispersions of this disclosure are typically applied in the field as dilutions into oil or oil/water/surfactant carriers. The composition may contain other formulated agronomic additives such as, for example, an antifoaming agent, a stabilizer, a fragrant, a sequestering agent, a neutralizing agent, a buffer, a corrosion inhibitor, a dye, a safener, an odorant, and a surfactant and/or surfactant adjuvant. Concentrated formulations may be diluted from 1 to 2000 fold at point of use depending on the intended agricultural application. Application may be made by ground or aerial spray equipment.

The effective amount of the oil dispersion formulation of the present invention to be employed in a typical agricultural application often depends upon. for example, the type of plants, the stage of growth of the plant, severity of environmental conditions, the weeds, insects or fungal pathogens to be controlled and application conditions. Typically, a plant in need of protection from weeds or insects, or disease pathogen control or elimination, is contacted with an amount of the oil dispersion formulation diluted in a carrier such as water that will provide an amount from about 1 to about 40,000 ppm, preferably from about 10 to about 20,000 ppm of the active ingredient.

Specific Embodiments

Oscillatory Strain Amplitude Sweep Test Method

Oscillatory strain amplitude sweep tests are performed using an Anton Parr MCR 301 rheometer in the manual mode. The storage (G') and loss moduli (G") are measured by placing the sample between two rheometer plates and applying increasing strain. The measurements are carried out at room temperature using a cone and plate geometry with 50 mm diameter and 1. cone angle with a sample size of ~0.4 mg. Rheoplus software 3.41 is used to calibrate the instrument, setup and run the experiments, collect and analyze the raw experimental data.

Materials poly-THF is a bis-hydroxy terminated polytetrahydrofuran of Mn 2900. This is a hydrophobic comonomer and is commercially available as polytetrahydrofuran from Sigma Aldrich (Millipore Sigma).

Aromatic 200 is commercially available from ExxonMobil and its distributors.

MSO is obtained from Lovaland Products.

Isophorone diisocyanate, obtained from Sigma Aldrich (Millipore Sigma).

The Sn catalyst, dibutyltin dilaurate, is obtained from Sigma Aldrich (Millipore Sigma).

The general procedure for the polycondensation reaction involving poly-THF, a diisocyanate and a diamine in AROMATIC 200 is given in Example 1.

Example 1A

Preparation of a Polyurea-Based Polymeric Rheology Modifier of Mn 19,200 from Poly-THF, Isophorone Diisocyanates, 1, 2 Diaminopropane, and Butyl Amine in Aromatic 200

AROMATIC 200 is first dried using molecular sieves for at least 12 h and the dried solvent is used to prepare a 12 wt. % poly-THF solution. The poly-THF solution in AROMATIC 200 is dried again using molecular sieves for at least 12 h prior to use. All glassware and joints that are used in the reaction are dried in an oven at 150 C. In Step 1, charge 150 mL of the 12 wt. % poly-THF solution, isophorone diisocyanate (2 equivalents of NCO per hydroxy group), and Sn catalyst (50 mg) to the reactor, which is a 3-neck flask. Heat the reactor to 90 C with overhead stirring. Hold the reaction mixture at 90 C for 1 h. Cool to 40 C. Add 0.9 equivalents (based on unreacted NCO) of 1, 2-diaminopropane (DAP) and hold the reaction mixture at 40 C for 30 min. Then, add 0.1 equivalent of butyl amine and heat the resulting mixture to 70 C and immediately cool it to 40 C. The Mn of the product mixture is analyzed by gel permeation chromatography (GPC) using calibration standards. Polymer properties are shown in Table 1 below.

Example 1B

Preparation of a Polyurea-Based Polymeric Rheology Modifier of Mn 10,800

Ex. 1A is repeated except that the NCO terminated prepolymer is reacted with 0.2 equivalents of 1, 2-diaminopropane in step 2. Polymer properties are shown in Table 1 below.

Example 2

Preparation of a Polyurea-Based Polymeric Rheology Modifier of Mn 20,000 from Poly-THF, Hexamethylene Diisocyanate, 1, 2 Diaminopropane, and Butyl Amine in Aromatic 200

The procedure of Ex. 1 is repeated, except that hexamethylene diisocyanate is used instead of isophorone diisocyanate (IPDI) in step 1. Polymer properties are shown in Table 1 below.

Example 3

Preparation of a Polyurea-Based Polymeric Rheology Modifier of Mn 80,000 from Poly-THF, Isophorone Diisocyanate, 1, 2 Diaminopropane, and Butyl Amine in Aromatic 200

A poly-THF solution is prepared as in Ex. 1. In Step 1, charge 150 mL of the 12 wt. % poly-THF solution, isophorone diisocyanate (1.05 equivalents of NCO per hydroxy group), and Sn catalyst (50 mg) to the reactor, which is a 3-neck flask. Heat the reactor to 90 C with overhead stirring. Hold the reaction mixture at 90 C for 1 h. Add 0.95 equivalent of isophorone diisocyanate and hold at 90 C for another 1 h. Cool to 40 C. Add 0.9 equivalents (based on unreacted NCO) of 1, 2-diaminopropane and hold the reaction mixture at 40 C for 30 min. Then, add 0.1 equivalent of butyl amine and heat the resulting mixture to 70 C and immediately cool it to 40 C. The Mn of the product mixture is determined by GPC using calibration standards.

Example 4

Synthesis of Polymeric Rheology Modifier in MSO

MSO is dried using molecular sieves for at least 12 h. All glassware and joints used in the reaction are dried in an oven at 150 C. The following is the general procedure for the polycondensation reaction involving poly-THF, a diisocyanate and a diamine in MSO. Charge 30 g of poly-THF and heat the reactor to 70 C to prepare a poly-THF melt that can be stirred using an overhead mixer. Charge the isocyanate (2 equivalents per hydroxyl group) and Sn catalyst (50 mg) to the reactor at 70 C. Hold the reaction mixture at 70 C for 1 h. Add 300 ml of MSO to the mixture, which comprises a polyurethane prepolymer. Cool to 40 C, add 0.9 equivalents of 1, 2 diaminopropane based on residual NCO, and hold the reaction mixture at 40 C for 30 min. Then, add butyl amine at 40 C and heat the mixture to 70 C and immediately cool it to 40 C. The Mn of the product mixture is determined by GPC using calibration standards.

Example 5

Synthesis of Polymeric Rheology Modifier without Solvent

The following is the general procedure for the polycondensation reaction involving poly-THF, a diisocyanate and a diamine without any solvent. All glassware and joints used in the reaction are dried in an oven at 150 C. Charge 30 g of poly-THF and heat the reactor to 90 C to prepare a poly-THF melt that can be stirred using an overhead mixer. Charge the isocyanate (2 equivalents per hydroxyl group) and Sn catalyst (50 mg) to the reactor at 90 C. Hold the reaction mixture at 90 C for 1 h. Add 0.9 equivalents of 1, 2 diaminopropane based on residual NCO at 90 C, and hold the reaction mixture at 90 C for 30 min. Then, add 0.1 equivalent of butyl amine at 90 C and hold for another 30 min. The Mn of the product mixture is analyzed by GPC using calibration standards.

Example 6

Viscosity

For initial screening, low shear Brookfield Viscosity is used to study the ability of the polyurea-based polymeric rheology modifier of Example 1 to thicken AROMATIC 200. As shown in Table 1, the baseline viscosity of AROMATIC 200 is 17 cP. At 12 wt. % prepolymer concentration, the viscosity increases to 78 cP. Upon introduction of urea functionally with 0.2 equivalents of 1, 2-diaminopropane (DAP) (Ex. 1B), the viscosity is further enhanced to 180 cP indicating the impact of urea groups on the viscosifying effect of the hydrophobic polyurea in AROMATIC 200. When the rheology modifier of Ex. 1A is employed, it dramatically and desirably increases the viscosity resulting in formation of a non-stirrable gel at 12 wt. %. Even after diluting to 6.6 wt. % in AROMATIC 200, the viscosity of the dispersion of the rheology modifier of Ex. 1A remains high at 12,8312 cP. Upon dilution to 3 wt. %, the viscosity remains as high as 3,356 cP. This demonstrates the impact of urea concentration in the polymer chain and, to some extent, the Mn of the polymeric rheology modifier on the association behavior of the polymer of Ex. 1A in AROMATIC 200.

TABLE 1

Low Shear Viscosity of Mn ca. 19k; Mw ca. 50k Polymer Derived from IPDI & DAP as a Function of Urea and Polymer Concentrations at 25 C.

| Polymer | Polymer (Wt.%) | Compatible | Mn, Mw | Brookfield Viscosity (Spindle, RPM) in cP at 25 C |
|---|---|---|---|---|
| None Aromatic 200 Oil | — | — | — | 17 (RV03, 100 RPM) |
| P-BO-Urethane-Prepolymer of Ex. 1 | 12 | Yes | 7k, 14k | 78 (RV03, 100 RPM) |
| Polymer of Ex. 1B | 12 | Yes | 10.8k, 25.1k | 180 (RV03, 100 RPM) |
| Polymer of Ex. 1A | 3 | Yes | 19.2K, 53.7k | 3356 (RV03, 2 RPM) |
| Polymer of Ex. 1A | 6.6 | Yes | 19.2K, 53.7k | 128312 (RV07, 2 RPM) |

Example 7

Modulus Measurements

Figure 2:
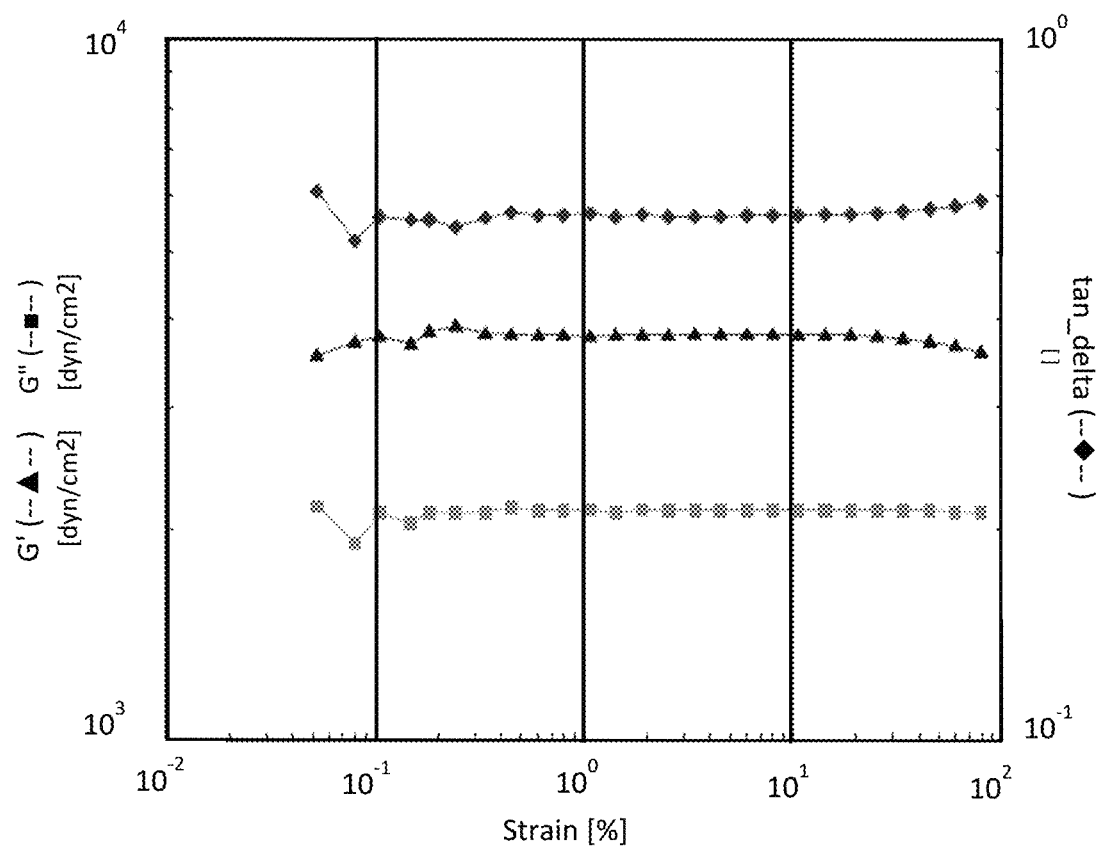
FIG. 2 is plot of an oscillatory strain amplitude sweep test for the polymeric rheology modifier of Example 1A having 10 wt. % polymer in Aromatic 200.

The storage and loss moduli of the polymer of Ex. 1A (Mn=ca. 19.2 k) gels in AROMATIC 200 as a function of applied strain are measured according to the method described hereinabove. The results are shown in FIG. 1 for 6 wt. % polymer and in FIG. 2 for 10 wt. % polymer. At 6 wt. % polymer, the oil formulation prepared using the rheology modifier of Ex. 1A exhibit a definitive storage modulus and it does not change with increase in strain amplitude. This demonstrates that the polymeric rheology modifier surprisingly forms a stable gel network in Aromatic 200. It is known to those skilled in the art that the storage modulus of oils formulated with clay or silica-based rheology modifiers tend to decrease at higher strain amplitude.

When the polymer concentration is increased to 10 wt. %, the storage modulus moves above the loss modulus in the linear viscoelastic region with the G'/G" ratio being 1.78. This demonstrates that the association at higher polymer concentrations is strong enough to lift the storage modulus above the loss modulus. The rheology parameter may be improved by increasing the molecular weight of the polymer (Ex. 2) and/or incorporating urea functionality derived from more rigid diisocyanates, such as hexamethylene diisocyanate (Ex. 3). The data in Table 2 demonstrate the improved rheology parameters for Ex. 2 and Ex. 3 at relatively lower polymer concentrations.

The oscillatory rheology behavior of H-bonding based associative polymers is slightly different from that of clay/silica based system. Unlike the clay/silica based system, the G' and G" of hydrophobic polyurea tends to not change with change in stress/strain. The stress/strain independent behavior remains the same, whether the gel is weak (G'<G") or strong (G'>G"). This implies that the applied stress does not irreversibly collapse the gel structure, but instead just distorts the network slightly, and that the structure eventually reverts back to the original structure as soon as the stress is removed. The difference in rheology behavior of the H-bonding associative polymer of this disclosure compared to that of a clay/silica system suggests that the correlation of rheology to their impact on the stability of an OD may be different. For example, a system with G'<G" may exhibit better stability, unlike the clay/silica based system.

Example 8

Formulating with Calcium Dodecylbenzene Sulfonate

A homogeneous solution of the polymeric rheology modifier of Ex. 1A and calcium dodecyl sulfonate of desired concentration in a given oil is prepared by mixing an appropriate amount of Ex. 1A stock solution (12 wt. % solution of the polymer in Aromatic 200) with an appropriate amount of calcium dodecyl sulfonate (30 wt. % in Solvesso 150) and heated to 70 C. The resulting dispersion is mixed well using an overhead stirrer and is cooled to room temperature. The polymer solution in oil is equilibrated for 24 h prior to use.

Oscillatory strain amplitude sweep testing of the mixture of Ex. 8 demonstrates that even at 1% polymer concentration, the storage modulus of this polymeric rheology modifier in AROMATIC 200 is greater than the loss modulus in the presence of 0.3 wt. % calcium dodecyl benzene sulfonate; see Table 2

Without wishing to be bound by any theory, it is hypothesized that the synergic interaction between the calcium salt of dodecylbenzene sulfonate and the polyurea-based polymeric rheology modifier is most likely due to the interaction of calcium ions with urea-bearing polymer chains. The cation-urea interaction is believed to pull polymer chains into closer proximity, thereby resulting in stronger associations. The calcium salt of dodecylbenzene sulfonate is a synergic additive that can be used to manipulate the gel strength, viscosity, flow and emulsifying ability of the H-bonding polymeric rheology modifier. The sulfonate serves both as an emulsifier and a rheology promoter in the presence of the rheology modifier of this disclosure.

TABLE 2

Oscillatory Strain Amplitude Sweep Test on Polyurea based Polymeric Rheology Modifiers in Aromatic 200.

| Polymer (Concentration) | Storage Modulus (G') in the linear viscoelastic region | Loss Modulus (G") in the linear viscoelastic region | G'/G" |
|---|---|---|---|
| EX. 1A (6 wt. %) | 320 Pa | 390 Pa | 0.82 |
| EX. 1A (10 wt. %) | 3,790 Pa | 2,125 Pa | 1.78 |

TABLE 2-continued

Oscillatory Strain Amplitude Sweep Test on Polyurea based Polymeric Rheology Modifiers in Aromatic 200.

| Polymer (Concentration) | Storage Modulus (G') in the linear viscoelastic region | Loss Modulus (G") in the linear viscoelastic region | G'/G" |
|---|---|---|---|
| EX. 2 (5 wt. %) | 150 Pa | 36 Pa | 4.16 |
| EX. 3 (3 wt. %) | 95 Pa | 7.2 Pa | 13.2 |
| EX. 8 (1 wt. %) | 7.0 Pa | 1.5 Pa | 4.67 |

We have established through rheological measurements that a gel structure can be constructed in hydrophobic oils that results in efficient thickening at relatively low molecular weight and concentration.

Oscillatory strain analysis shows the urea-based rheology modifier of this disclosure imparts elastic character, as indicated by a high (>1 Pa) storage modulus (G'), to oil dispersions resulting in the formation of a gel network enabled by urea-urea H-bonding. The urea based associative rheology modifier approach offers a variety of ways to modulate gel strength, viscosity, flow and emulsifying ability of OD based Ag formulations to suit a given application space.

Rheology analysis of an OD formulated with the polyurea-based polymeric rheology modifier and calcium dodecylbenzene sulfonate demonstrates that the storage modulus (G') of the dispersion is larger than the loss modulus (G") even at 1 wt. % of polymer. This indicates the presence of a strong gel structure and demonstrates the influence of the rheology promoter on the efficiency of the polyurea-based polymeric rheology modifier.

What is claimed is:

1. A dispersion of a pesticide in an agricultural oil comprising: (a) an oil-compatible, polyurea-based polymeric rheology modifier, (b) an agricultural oil, and (c) a dispersed particulate pesticide, wherein the oil-soluble, polyurea-based polymeric rheology modifier has the following structure:

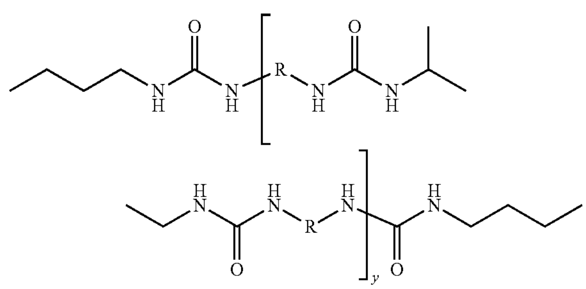

where y is from 1 to 30, and R is a polyether polyurethane prepolymer of the structure:

R =

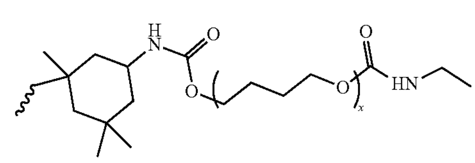

-continued
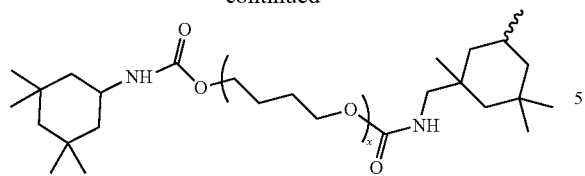
where each x independently is from 1 to 200, wherein the polymeric rheology modifier has a number average molecular weight (Mn) of from 1000 daltons to 100,000 daltons, and wherein the dispersion comprises from 0.1 to 20% (a), from 10 to 99.8% wt. % (b) from 0.1 to 70 wt. % (c), wherein a total wt. % of (a), (b), (c), is 100 wt. %.
2. The dispersion of claim 1, wherein x is from 3 to 50, or 20 to 40, and y is from 1 to 10, or from 1 to 5.
* * * * *